(12) United States Patent
Noguchi et al.

(10) Patent No.: US 10,331,052 B2
(45) Date of Patent: Jun. 25, 2019

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Kazunori Noguchi, Suntou-gun (JP); Takeshi Murakami, Numazu (JP); Nobuhiro Nakamura, Numazu (JP); Atsushi Okuda, Yokohama (JP); Harunobu Ogaki, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/842,675

(22) Filed: Dec. 14, 2017

(65) Prior Publication Data
US 2018/0173121 A1 Jun. 21, 2018

(30) Foreign Application Priority Data
Dec. 20, 2016 (JP) .................. 2016-247121

(51) Int. Cl.
*G03G 5/00* (2006.01)
*G03G 5/05* (2006.01)
*G03G 15/00* (2006.01)
*G03G 5/06* (2006.01)
*C08G 63/682* (2006.01)
*G03G 5/147* (2006.01)
*C08G 63/193* (2006.01)

(52) U.S. Cl.
CPC ........... *G03G 5/056* (2013.01); *C08G 63/193* (2013.01); *C08G 63/6826* (2013.01); *G03G 5/0614* (2013.01); *G03G 5/14752* (2013.01); *G03G 15/75* (2013.01)

(58) Field of Classification Search
CPC .......................... G03G 5/0614; G03G 5/14752
USPC .................................... 430/66, 59.6
See application file for complete search history.

(56) References Cited

FOREIGN PATENT DOCUMENTS

| JP | 2000-227667 A | 8/2000 |
|----|---------------|--------|
| JP | 2006-53549 A | 2/2006 |
| JP | 2007-79555 A | 3/2007 |
| JP | 2008-74714 A | 4/2008 |
| JP | 4449481 B2 | 4/2010 |

*Primary Examiner* — Mark A Chapman
(74) *Attorney, Agent, or Firm* — Canon U.S.A. Inc., IP Division

(57) ABSTRACT

An electrophotographic photosensitive member includes a surface layer containing a charge transporting material and a polyester resin having a specific structure.

7 Claims, 2 Drawing Sheets

ELECTROPHOTOGRAPHIC PHOTOSENSITIVE MEMBER, PROCESS CARTRIDGE, AND ELECTROPHOTOGRAPHIC APPARATUS

BACKGROUND OF THE INVENTION

Field of the Invention

The present disclosure relates to an electrophotographic photosensitive member, a process cartridge, and an electrophotographic apparatus.

Description of the Related Art

The demand for high speed printing has been increased in electrophotographic processes. Accordingly, further improved responsiveness is demanded of the electrophotographic photosensitive members. It is also demanded to reduce the causes of deterioration of image quality, such as ghosting and the memory effect of light. Japanese Patent Laid-Open No. 2008-74714 discloses a technique using a charge transporting material having a high charge carrier mobility in the charge transport layer for increasing the responsiveness of an electrophotographic photosensitive member.

If the charge transport layer acts as the surface layer or uppermost layer, it is further required to be resistant to externally applied electrical and mechanical forces. Accordingly, Japanese Patent Laid-Open Nos. 2000-227667 and 2006-53549 and Japanese Patent No. 4449481 disclose techniques using a photosensitive member including a surface layer made of a polyester resin having a high mechanical strength.

More specifically, Japanese Patent Laid-Open No. 2000-227667 discloses an electrophotographic photosensitive member including a surface layer made of a polyester resin containing biscresolfluorene. Japanese Patent No. 4449481 discloses an electrophotographic photosensitive member including a surface layer made of a polyester resin containing a bisphenol phenylene ring having an ethyl group. Japanese Patent Laid-Open No. 2006-53549 discloses an electrophotographic photosensitive member including a surface layer made of a polyester resin containing a diphenyl ether dicarboxylic acid moiety. According to these disclosures, the durability of the electrophotographic photosensitive member can be improved.

SUMMARY OF THE INVENTION

The present disclosure provides an electrophotographic photosensitive member including a surface layer containing a charge transporting material and a polyester resin. The polyester resin includes a structure represented by general formula (I) and a structure represented by general formula (II):

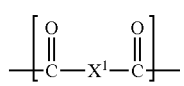

wherein $X^1$ represents a divalent group.

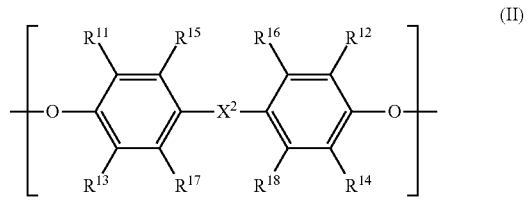

wherein $X^2$ represents a member selected from the group consisting of a single bond, an oxygen atom, divalent alkylene groups, and divalent cycloalkylidene groups, and $R^{11}$ to $R^{18}$ each represent a member selected from the group consisting of a hydrogen atom and alkyl groups.

The structure represented by general formula (I) includes the structure represented by formula (I-1):

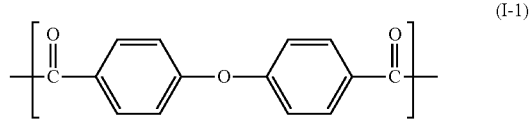

Also, the structure represented by general formula (II) includes at least one of a structure represented by general formula (II-A) and a structure represented by general formula (II-B):

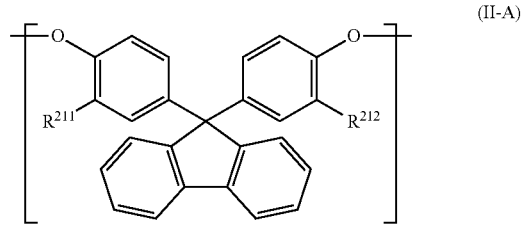

wherein $R^{211}$ and $R^{212}$ each represent a member selected from the group consisting of a hydrogen atom, a methyl group, and an ethyl group.

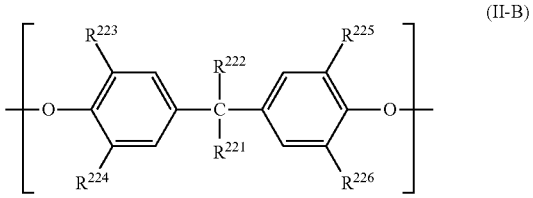

wherein $R^{221}$ and $R^{222}$ each represent a member selected from the group consisting of a hydrogen atom, a methyl group, an ethyl group, and a phenyl group, and $R^{223}$ to $R^{226}$ each represent a member selected from the group consisting of a hydrogen atom, alkyl groups having a carbon number of 1 to 5, and a phenyl group, at least one of $R^{223}$ to $R^{226}$ being one of an alkyl group having a carbon number of 2 or more and a phenyl group.

According to another aspect of the present disclosure, a process cartridge capable of removably mounted to an electrophotographic apparatus is provided. The process cartridge includes the above-described electrophotographic photosensitive member and at least one device selected from the group consisting of a charging device, a developing device, a transfer device, and a cleaning device. The electrophotographic photosensitive member and the at least one device are held in one body.

Also, an electrophotographic apparatus is provided. The apparatus includes the above-described electrophotographic photosensitive member, a charging device, an exposure device, a developing device, and a transfer device.

The electrophotographic photosensitive member, the process cartridge, and the electrophotographic apparatus according to any of the embodiments of the present disclosure exhibit both a high durability and a high responsiveness. In addition, in the electrophotographic photosensitive member according to any of the embodiments of the present disclosure, ghosting and the memory effect of light can be reduced.

Further features of the present disclosure will become apparent from the following description of exemplary embodiments with reference to the attached drawings.

DESCRIPTION OF THE EMBODIMENTS

Figure 1:
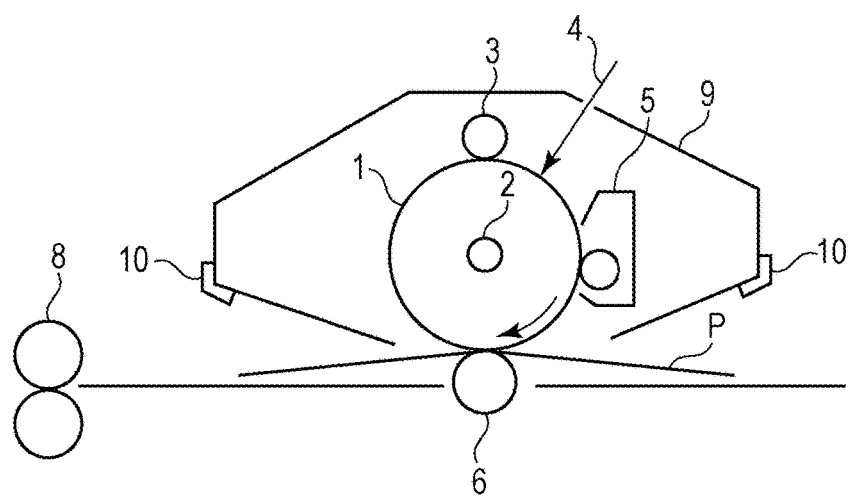
FIG. 1 is a schematic view of the structure of an electrophotographic apparatus provided with a process cartridge.

In an examination by the present inventors, the electrophotographic photosensitive members using a polyester resin disclosed in the above-cited Japanese Patent Laid-Open No. 2000-227667 and Japanese Patent No. 4449481 exhibited improved durability. However, the responsiveness has not been improved as required, and the memory effect of light has not been reduced as required.

Accordingly, the present disclosure provides an electrophotographic photosensitive member having both a high durability and a high responsiveness, and in which ghosting and the memory effect of light are reduced. The present disclosure also provides a process cartridge and an electrophotographic apparatus that include the electrophotographic photosensitive member.

According to an embodiment of the present disclosure, there is provided an electrophotographic photosensitive member including a surface layer containing a charge transporting material and a polyester resin. The polyester resin includes a structure represented by general formula (I) including the structure represented by formula (I-1), and a structure represented by general formula (II) including at least one of a structure represented by general formula (II-A) and a structure represented by general formula (II-B):

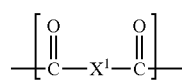

(I)

In general formula (I), $X^1$ represents a divalent group. Examples of the divalent group include phenylene, biphenylene, naphthylene, alkylene, cycloalkylidene, and a divalent group (-Ph-O-Ph-) having two p-phenylene groups bound to each other with an oxygen atom therebetween.

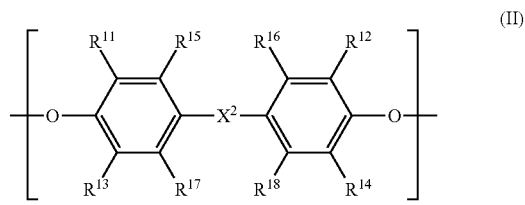

(II)

In general formula (II), $X^2$ represents a member selected from the group consisting of a single bond, an oxygen atom, divalent alkylene groups, and divalent cycloalkylidene groups, and $R^{11}$ to $R^{18}$ each represent a hydrogen atom or an alkyl group.

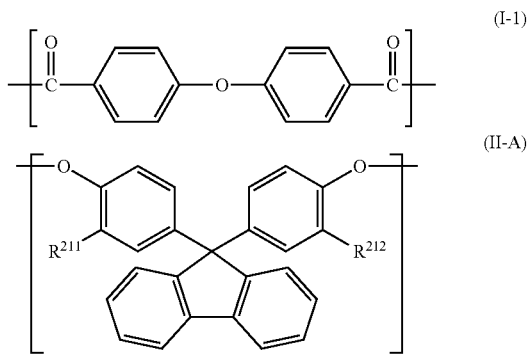

(I-1)

(II-A)

In general formula (II-A), $R^{211}$ and $R^{212}$ each represent a member selected from the group consisting of a hydrogen atom, a methyl group, and an ethyl group.

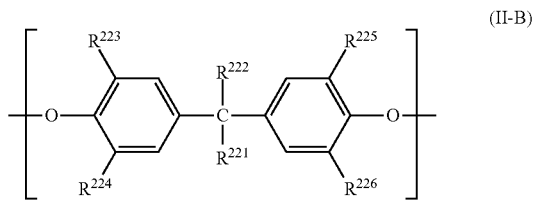

(II-B)

In general formula (II-B), $R^{221}$ and $R^{222}$ each represent a member selected from the group consisting of a hydrogen atom, a methyl group, an ethyl group, and a phenyl group. $R^{223}$ to $R^{226}$ each represent a member selected from the group consisting of a hydrogen atom, alkyl groups having a carbon number of 1 to 5, and a phenyl group, and at least one of $R^{223}$ to $R^{226}$ are an alkyl group having a carbon number of 2 or more or a phenyl group.

The structure represented by general formula (I) is derived from a dicarboxylic acid compound, and the structure represented by general formula (II) is derived from a bisphenol compound (having two hydroxyphenyl groups). The compounds deriving these structures react with each other to form an ester bond, thereby forming the following structural unit:

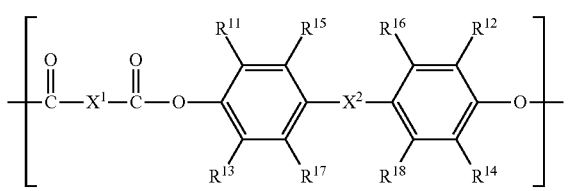

The present inventors assume that the reason why the use of the above-described polyester resin in the surface layer containing a charge transporting material achieves both a high durability and a high responsiveness is as below.

The present inventors have thought that use of a rigid material having a molecular structure that is likely to stack, such as phenylene, in the surface layer is effective in enhancing durability. The present inventors however think that when a material having only such a structure is used with a charge transporting material, the rigidity and the stacking structure of the resin hinder the migration of the charge transporting material.

Accordingly, the inventors attempted to introduce a bulky structure such as the structure represented by general formula (II-A) or the structure represented by general formula (II-B) to a resin chain for increasing charge carrier mobility. However, merely introducing such a structure did not achieve both desired durability and desired responsiveness simultaneously.

The present inventors believe that both a high durability and a high responsiveness can be achieved by using a resin having a rigid and flexible structure including a bulky portion that is formed by introducing both a structure represented by formula (I-1) and a structure represented by general formula (II-A) or (II-B).

The structure represented by formula (I-1) is considered to be flexible due to the diphenyl ether structure in which rigid benzene rings are bound to each other with an ether bond therebetween.

One reason why ghosting is reduced is probably that the structure represented by formula (I-1) and the structure represented by general formula (II-A) are introduced to the same resin chain. These two structures seem to impart both a high rigidity and a high flexibility to the resin structure. Another reason is probably that the structure of general formula (II-A) having a fluorene skeleton and the charge transporting material are evenly distributed to reduce an accumulation of charge carriers.

Also, the reason why the memory effect of light is reduced is probably that the structure represented by formula (I-1) having a high degree of freedom and the structure represented by general formula (II-B) having a side chain including a bulky group are introduced to the same resin. The bulky group in the side chain of the structure of formula (II-B) seems to further increase the degree of freedom of the structure of formula (I-1).

Thus, the degree of freedom of the charge transporting material is increased, and consequently, the memory effect of light is reduced.

When the polyester resin includes the structure represented by formula (I-1) as a structure represented by formula (I), an advantageous effect can be produced effectively. Beneficially, in the polyester resin, the proportion of the structure represented by formula (I-1) to the structures represented by general formula (I) is 30% by mole or more, more beneficially 50% by mole or more. When this proportion is 50% by mole or more, charge carrier mobility, which is an indicator of the responsiveness of the electrophotographic photosensitive member, is increased.

The polyester resin may further include other structures represented by formula (I) in addition to the structure represented by formula (I-1). Examples of such structures include structures derived from carboxylic acids, such as terephthalic acid, isophthalic acid, biphenyldicarboxylic acid, aliphatic dicarboxylic acids, and naphthalenedicarboxylic acid. More specifically, other structures represented by general formula (I) include the following:

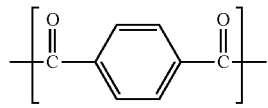

(I-2)

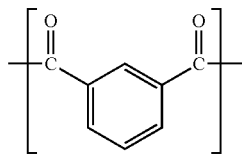

(I-3)

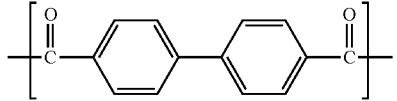

(I-4)

A copolymer with the structure represented by formula (I-2) is beneficial in terms of keeping charge carrier mobility high. This copolymer may be in any form, such as block copolymer, random copolymer, or alternating copolymer.

Examples of the structure represented by general formula (II-A) include the following:

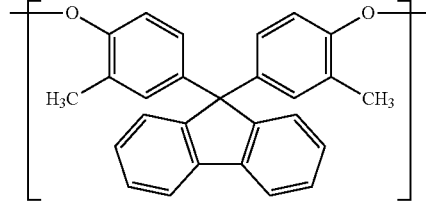

(II-A-1)

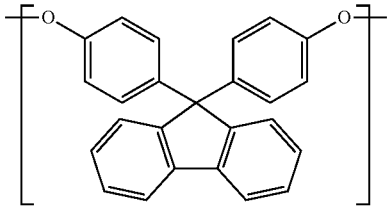

(II-A-2)

The structure represented by formula (II-A-1) is more beneficial in terms of achieving both a high durability and a high charge carrier mobility and reducing ghosting.

Beneficially, in the polyester resin, the proportion of the structure represented by formula (II-A-1) to the structures represented by general formula (II) is 30% by mole or more from the viewpoint of achieving a high charge carrier mobility. More beneficially, the proportion of the structure represented by formula (II-A-1) is 40% by mole or more and 80% by mole or less from the viewpoint of achieving both a high durability and a high charge carrier mobility and reducing ghosting.

Examples of the structure represented by general formula (II-B) include the following:

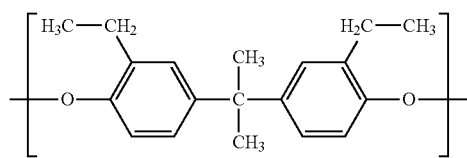
(II-B-1)

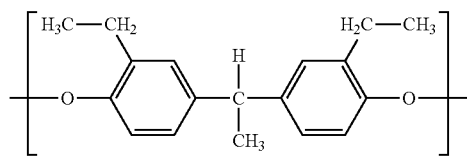
(II-B-2)

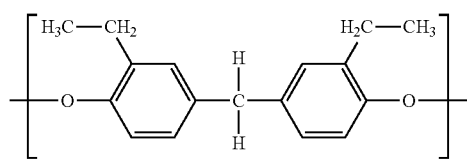
(II-B-3)

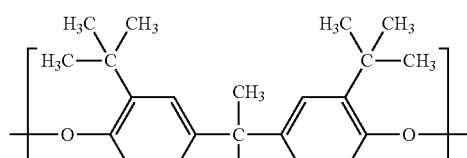
(II-B-4)

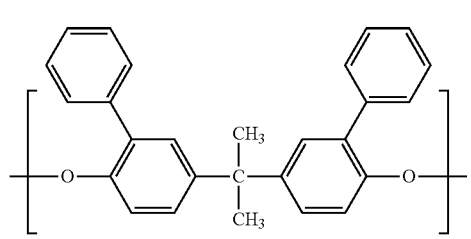
(II-B-5)

The structure represented by formula (II-B-1) is more beneficial in terms of achieving both a high durability and a high charge carrier mobility and reducing ghosting.

Beneficially, the polyester resin may further include a structure represented by general formula (II-2) as a structure represented by general formula (II). Beneficially, the structure represented by general formula (II) includes a structure represented by general formula (II-2) and at least one of a structure represented by general formula (II-A) and a structure represented by general formula (II-B).

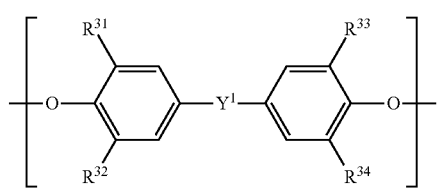
(II-2)

In general formula (II-2), $R^{31}$ to $R^{34}$ each represent a member selected from the group consisting of a hydrogen atom and alkyl groups, and $Y^1$ represents a member selected from the group consisting of a single bond, an oxygen atom, divalent alkylene groups, and divalent cycloalkylidene groups.

Examples of the structure represented by general formula (II-2) include the following:

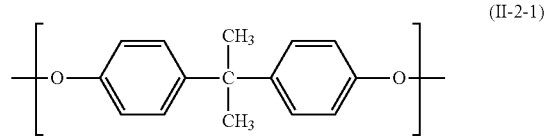
(II-2-1)

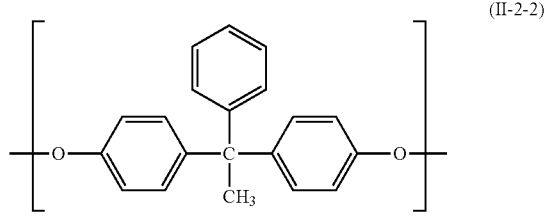
(II-2-2)

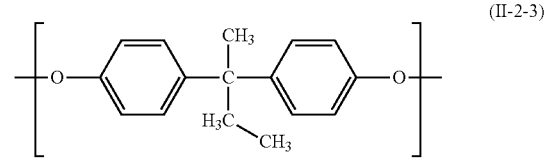
(II-2-3)

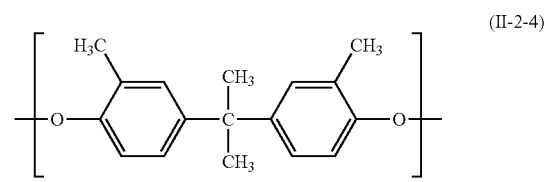
(II-2-4)

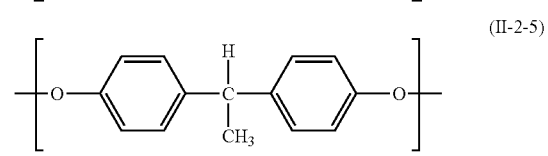
(II-2-5)

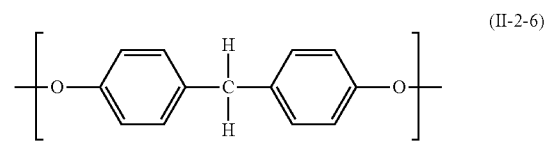
(II-2-6)

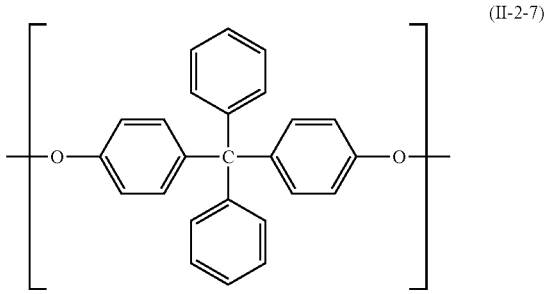
(II-2-7)

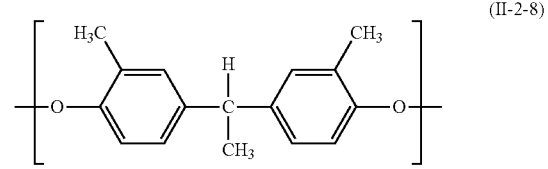
(II-2-8)

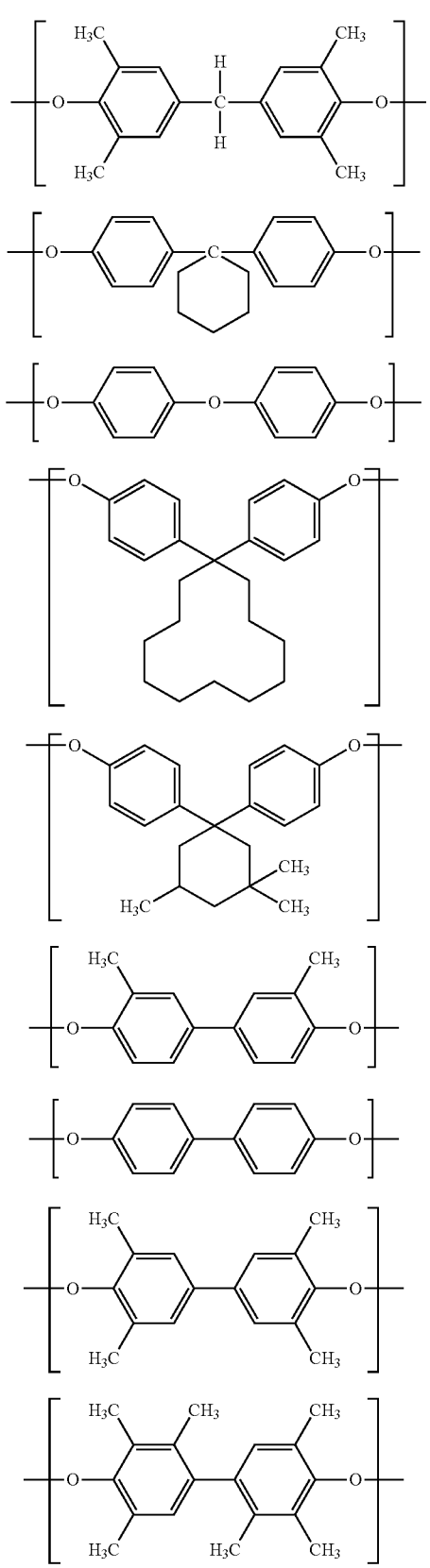

Beneficially, $Y^1$ is a single bond. More specifically, structures represented by formulas (II-2-14), (II-2-15), (II-2-16), and (II-2-17) are more beneficial from the viewpoint of achieving a high durability. The structure represented by formula (II-2-16) is particularly beneficial from the viewpoint of achieving both a high durability and a high responsiveness and reducing ghosting and the memory effect of light. The copolymer of the structure of general formula (I) and the structure of general formula (II) may be in any form, such as block copolymer, random copolymer, or alternating copolymer. A random copolymer is more beneficial in terms of responsiveness.

Beneficially, the proportion of the structure represented by general formula (II-A) or the structure represented by general formula (II-B) to the structures represented by general formula (II) in the polyester resin is 30% by mole or more, and more beneficially in the range of 30% by mole to 60% by mole. Also, the proportion of the structure represented by formula (II-2-16) is beneficially in the range of 30% by mole to 60% by mole. When the polyester resin satisfies these conditions, both a high charge carrier mobility and a high durability can be achieved.

The surface layer may further contain any other resin as a binder resin. Such resins include polycarbonate resin, polymethacrylic acid ester resin, polysulfone resin, and polystyrene resin. Some of these resins may be mixed or copolymerized. If any of these resins other than the polyester resin of the present disclosure is used, it is beneficial that the proportion of the mass of the polyester resin to the total mass of the binder resins is 50% by mass or more.

The weight average molecular weight of the binder resins may be in the range of 60,000 to 200,000, such as in the range of 80,000 to 150,000. This weight average molecular weight refers to the polystyrene-equivalent weight average molecular weight measured by the method disclosed in Japanese Patent Laid-Open No. 2007-79555.

Electrophotographic Photosensitive Member

The electrophotographic photosensitive member according to an embodiment of the present disclosure includes a surface layer containing a charge transporting material. The electrophotographic photosensitive member may further include a support member and a photosensitive layer. The photosensitive layer may be: (1) a multilayer photosensitive layer; or (2) a single-layer photosensitive layer. (1) The multilayer photosensitive layer includes a charge generating layer containing a charge generating material, and a charge transport layer containing a charge transporting material. (2) The single-layer photosensitive layer is a photosensitive layer containing a charge generating material and a charge transporting material together. In the case of (1) using a multilayer photosensitive layer in an embodiment of the present disclosure, the surface layer containing a charge transporting material acts as the charge transport layer. In the case of (2) using a single-layer photosensitive layer, the surface layer containing a charge transporting material acts as the photosensitive layer. These layers will now be described.

The electrophotographic photosensitive member may be produced by applying each of the coating liquids prepared for forming the layers thereof, which will be described later, in a desired order, and drying the coatings. The coating liquids may be applied by dip coating, spray coating, curtain coating, or spin coating. From the viewpoint of efficiency and productivity, dip coating is more beneficial.

Support Member

The electrophotographic photosensitive member may include a support member. Beneficially, the support member is electrically conductive.

The electrically conductive support member may be made of a metal, such as aluminum, iron, nickel, copper, or gold, or an alloy thereof. Alternatively, an insulating support member made of, for example, a polyester resin, a polycarbonate resin, a polyimide resin, or glass, coated with an electrically conductive material may be used. In this instance, the electroconductive material may be a metal thin film of, for example, aluminum, chromium, silver, or gold, an electrically conductive metal oxide thin film of, for example, indium oxide, tin oxide, or zinc oxide, or a thin film of an electrically conductive ink containing silver nanowires.

The support member may be subjected to surface treatment by electrochemical operation such as anodization, or wet honing, blasting, or cutting to improve the electrical properties and suppress the occurrence of interference fringes.

The support member may be in the form of a cylinder, a belt, a film, or the like.

Electroconductive Layer

An electroconductive layer may be disposed on the support member. The average thickness of the electroconductive layer may be in the range of 0.2 µm to 40 µm, such as 1 µm to 35 µm or 5 µm to 30 µm.

The electroconductive layer may contain metal oxide particles and a binder resin.

Examples of the metal oxide of the metal oxide particles include zinc oxide, white lead, aluminum oxide, indium oxide, silicon oxide, zirconium oxide, tin oxide, titanium oxide, magnesium oxide, antimony oxide, bismuth oxide, tin-doped indium oxide, and antimony- or tantalum-doped tin oxide or zirconium oxide.

Particles of zinc oxide, titanium oxide, or tin oxide are beneficial.

The number average particle size of the metal oxide particles may be in the range of 30 nm to 450 nm, such as in the range of 30 nm to 250 nm, from the viewpoint of preventing local formation of conductive paths that is a cause of black points.

The binder resin may be a polyester resin, a polycarbonate resin, a polyvinyl butyral resin, an acrylic resin, a silicone resin, an epoxy resin, a melamine resin, a urethane resin, a phenol resin, or an alkyd resin.

The electroconductive layer may be formed by applying a coating liquid prepared for the electroconductive layer onto the support member.

The coating liquid for the electroconductive layer may contain a solvent in addition to the metal oxide particles and the binder resin. This solvent may be an alcohol-based solvent, a sulfoxide-based solvent, a ketone-based solvent, an ether-based solvent, an ester-based solvent, or an aromatic hydrocarbon.

The metal oxide particles are dispersed in the coating liquid by using, for example, a paint shaker, a sand mill, a ball mill, or a high-speed liquid collision disperser. The metal oxide particles may be surface-treated with a silane coupling agent or the like so as to be highly dispersed.

Also, the metal oxide particles may be doped with another metal or metal oxide to regulate the resistance of the electroconductive layer. Undercoat Layer An undercoat layer may be disposed on the support member or the electroconductive layer. The undercoat layer acts as a barrier and enhances adhesion. The average thickness of the undercoat layer may be in the range of 0.05 µm to 40 µm, such as 0.05 µm to 7 µm or 0.1 µm to 2 µm.

The undercoat layer may contain an electron transporting material and a binder resin to prevent accumulation of charge carriers generated from the charge generating layer. Such an undercoat layer allows the electrons of the charge carriers generated from the charge generating layer to be transported to the support member. Thus, charge deactivation and charge trapping are suppressed and are not increased in the charge generating layer even if the charge transport ability is increased. Thus, electrical properties at the beginning and during repeated use are improved.

Examples of the electron transporting material include quinone compounds, imide compounds, benzimidazole compounds, cyclopentadienylidene compounds, fluorenone compounds, xanthone-based compounds, benzophenone-based compounds, cyanovinyl-based compounds, naphthylimide compounds, and peryleneimide compounds.

The electron transporting material may have a polymerizable functional group, such as hydroxy, thiol, amino, carboxy, or methoxy.

Examples of the binder resin include polyacrylic acid-based resin, methyl cellulose, ethyl cellulose, polyamide resin, polyimide resin, poly(amide-imide) resin, polyamide acid resin, urethane resin, melamine resin, and epoxy resin. Alternatively, the binder resin may be a polymer having a cross-linked structure formed by thermally polymerizing (curing) a thermosetting resin having a polymerizable functional group, such as acetal resin or alkyd resin, and a monomer having a polymerizable functional group, such as an isocyanate compound.

The undercoat layer can be formed by applying a coating liquid for forming the undercoat layer containing a binder resin, and drying the coating.

Photosensitive Layer (1) Multilayer Photosensitive Layer

If the photosensitive layer has a multilayer structure, the electrophotographic photosensitive member includes a charge generating layer containing a charge generating material, and a charge transport layer containing a charge transporting material and a polyester resin including a structure represented by general formula (I) and a structure represented by general formula (II).

(1-1) Charge Generating Layer

The average thickness of the charge generating layer may be in the range of 0.05 µm to 5 µm, such as 0.05 µm to 1 µm or 0.1 µm to 0.3 µm.

Examples of the charge generating material include azo pigments, perylene pigments, anthraquinone derivatives, anthanthrone derivatives, dibenzpyrenequinone derivatives, pyranthrone derivatives, violanthrone derivatives, isoviolanthrone derivatives, indigo derivatives, thioindigo derivatives, phthalocyanine pigments, and bisbenzimidazole derivatives.

Among these, azo pigments and phthalocyanine pigments are beneficial. Among phthalocyanine pigments, oxytitanium phthalocyanine, chlorogallium phthalocyanine, and hydroxygallium phthalocyanine are more beneficial.

The charge generating layer may also contain a binder resin. Examples of the binder resin include polymers or copolymers of vinyl compounds, such as styrene, vinyl acetate, vinyl chloride, acrylic acid esters, methacrylic acid esters, vinylidene fluoride, and trifluoroethylene; and polyvinyl alcohol resin, polyvinyl acetal resin, polycarbonate resin, polyester resin, polysulfone resin, polyphenylene oxide resin, polyurethane resin, cellulose resin, phenol resin, melamine resin, silicone resin, and epoxy resin.

Among these, polyester resin, polycarbonate resin, and polyvinyl acetal resin are beneficial. Polyvinyl acetal resin is more beneficial.

The charge generating material content in the charge generating layer may be in the range of 30% by mass to 90% by mass, such as in the range of 50% by mass to 80% by mass, relative to the total mass of the charge generating layer.

In the charge generating layer, the mass ratio of the charge generating material to the binder resin (mass of the charge generating material : mass of the binder resin) may be in the range of 10:1 to 1:10, such as 5:1 to 1:5.

The charge generating layer may be formed by applying a coating liquid for the charge generating layer prepared by mixing the charge generating material and the binder resin with a solvent, and drying the coating. The solvent used in the coating liquid for the charge generating layer may be an alcohol-based solvent, a sulfoxide-based solvent, a ketone-based solvent, an ether-based solvent, an ester-based solvent, or an aromatic hydrocarbon.

(1-2) Charge Transport Layer

The thickness of the charge transport layer may be in the range of 5 µm to 50 µm, such as in the range of 10 µm to 35 µm.

Examples of the charge transporting material in the charge transport layer include polycyclic aromatic compounds, heterocyclic compounds, hydrazone compounds, styryl compounds, enamines, benzidine compounds, triarylamine compounds, and triphenylamine.

Alternatively, the charge transporting material may be a polymer having a group derived from these compounds in the main chain or a side chain.

Triarylamine compounds, enamines, and benzidine compounds are beneficial in terms of potential stability during repeated use.

A plurality of charge transporting materials may be used in combination. The following are exemplary charge transporting materials.

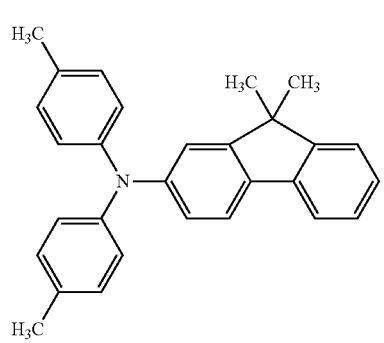

(CTM-1)

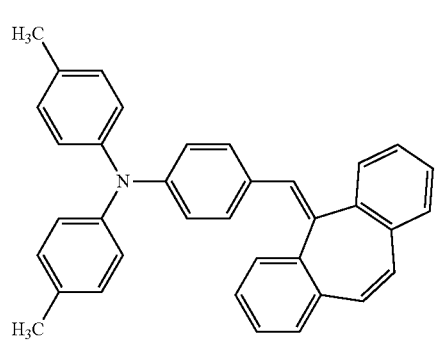

(CTM-2)

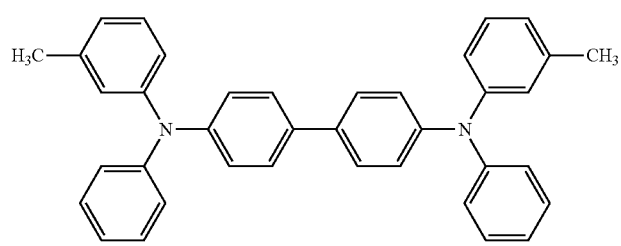

(CTM-3)

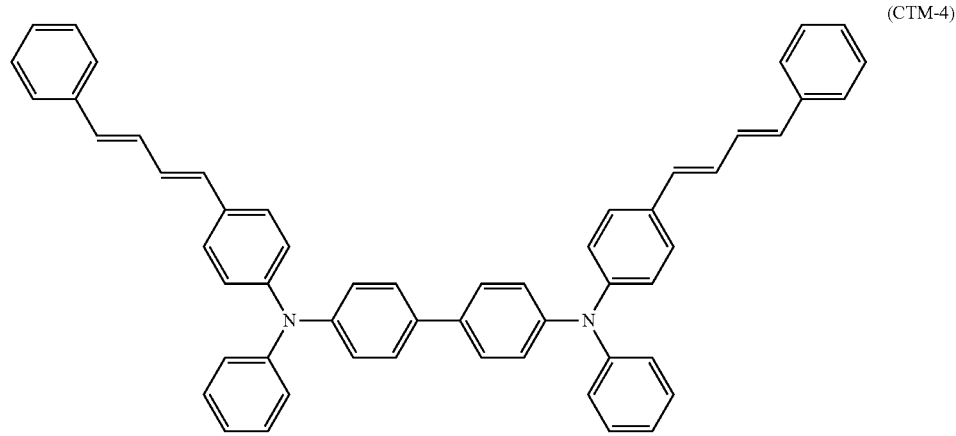

(CTM-4)

-continued
(CTM-5)
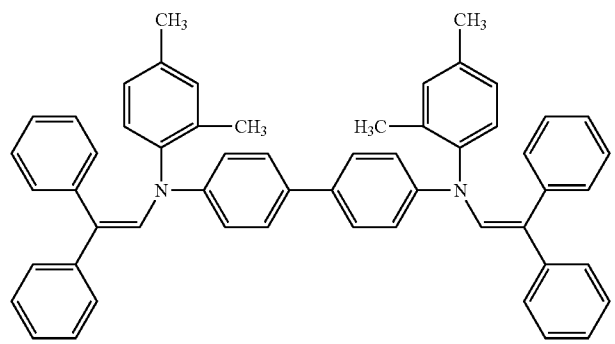
(CTM-6)
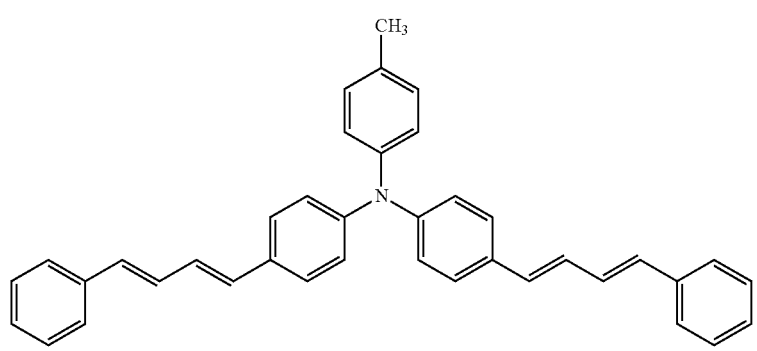
(CTM-7)
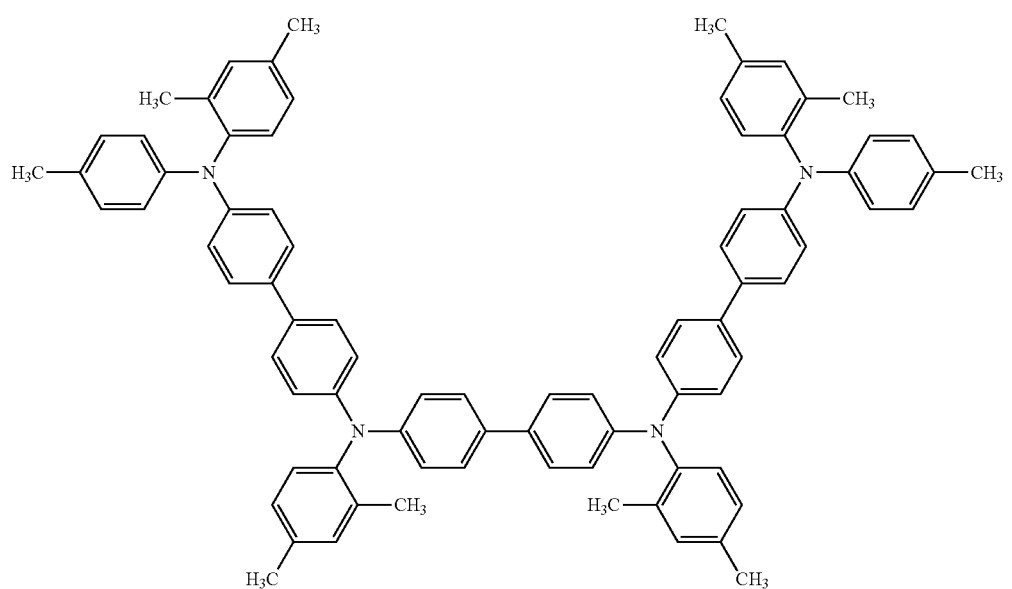
(CTM-8)
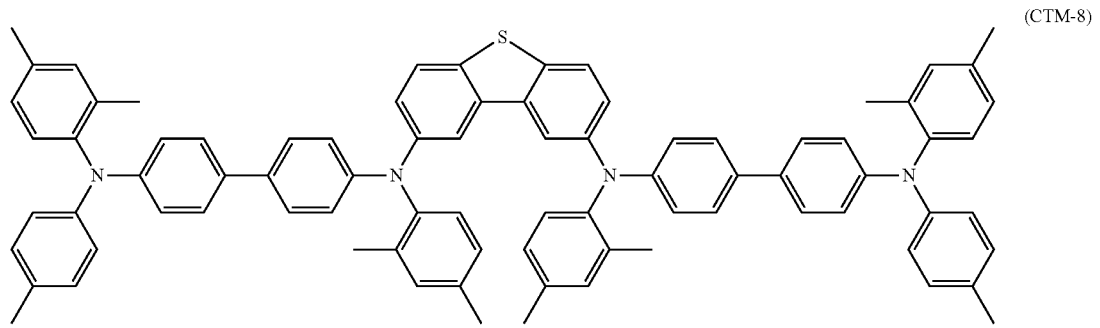

(CTM-9)

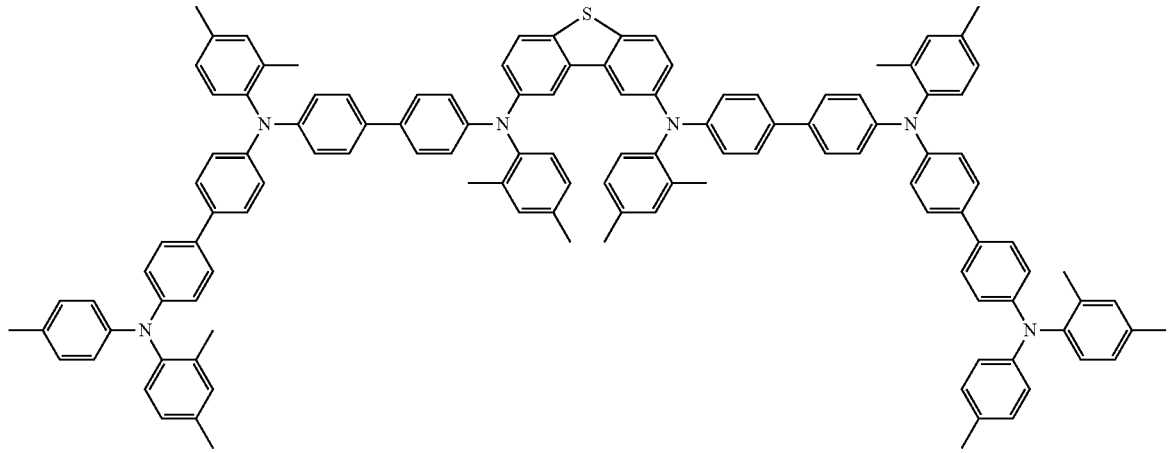

The binder resin used in the charge transport layer may be polyester, acrylic resin, phenoxy resin, polycarbonate, polystyrene, polyvinyl acetate, polysulfone, polyarylate, vinylidene chloride, and acrylonitrile copolymer. Among these, polycarbonate and polyarylate are beneficial.

The charge transporting material content in the charge transport layer may be in the range of 20% by mass to 80% by mass, such as in the range of 30% by mass to 60% by mass, relative to the total mass of the charge transport layer.

The charge transport layer may be formed by applying a coating liquid for the charge transport layer prepared by dissolving a charge transporting material and the polyester resin including a structure represented by general formula (I) and a structure represented by general formula (II) in a solvent, and drying the coating. The solvent used in the coating liquid for forming the charge transport layer may be an alcohol-based solvent, a sulfoxide-based solvent, a ketone-based solvent, an ether-based solvent, an ester-based solvent, or an aromatic hydrocarbon.

The charge transport layer may further contain an antioxidant, a UV absorbent, a plasticizer, a leveling agent, a lubricant, an abrasion resistance improver, and any other additive. More specifically, examples of such an additive include hindered phenol compounds, hindered amine compounds, sulfur compounds, phosphorus compounds, benzophenone compounds, siloxane-modified resin, silicone oil, fluororesin particles, polystyrene resin particles, polyethylene resin particles, silica particles, alumina particles, and boron nitride particles.

These additives may have been subjected to surface treatment. This surface treatment may be performed with a silane coupling agent or the like for hydrophobization.

(2) Single-layer Photosensitive Layer

If the photosensitive layer has a single-layer structure, the photosensitive layer contains a charge generating material, a charge transporting material, and the polyester resin including a structure represented by general formula (I) and a structure represented by general formula (II). The photosensitive layer may be formed by applying a coating liquid for the photosensitive layer prepared by dissolving a charge generating material, a charge transporting material, and the polyester resin including a structure represented by general formula (I) and a structure represented by general formula (II) in a solvent, and drying the coating. The charge transporting material may be selected from among the same charge transporting materials cited in "(1) Multilayer Photosensitive Layer".

Protective Layer

The surface layer may be covered with a protective layer as long as the advantageous effect intended in the present disclosure can be produced. The protective layer may contain electrically conductive particles or a charge transporting material and a binder resin. The protective layer may further contain an additive such as a lubricant. The binder resin in the protective layer may have electrical conductivity or charge transporting ability. In this instance, electrically conductive particles or a charge transporting material need not be added to the protective layer. The binder resin in the protective layer may be thermoplastic, or may be a resin cured by heat, light, or radiation (e.g. electron beam).

Process Cartridge and Electrophotographic Apparatus

The process cartridge according to an embodiment of the present disclosure is removably mounted to an electrophotographic apparatus and includes the above-described electrophotographic photosensitive member and at least one device selected from the group consisting of a charging device, a developing device, a transfer device, and a cleaning device. The electrophotographic photosensitive member and these devices are held in one body.

Also, the electrophotographic apparatus according to an embodiment of the present disclosure includes the above-described electrophotographic photosensitive member, a charging device, an exposure device, a developing device, and a transfer device.

FIG. 1 is a schematic view of the structure of an electrophotographic apparatus provided with a process cartridge including an electrophotographic photosensitive member.

This electrophotographic photosensitive member 1 is cylindrical and is driven for rotation on an axis 2 in the direction indicated by an arrow at a predetermined peripheral speed. The surface (periphery) of the electrophotographic photosensitive member 1 driven for rotation is uniformly charged to a predetermined positive or negative potential by a charging device 3 (primary charging device such as charging roller). Then, the surface or periphery is subjected to exposure (image exposure) 4 by an exposure device (not shown), such as a slit exposure or laser beam scanning exposure device. Thus, electrostatic latent images corresponding to desired images are formed one after another on the surface of the electrophotographic photosensitive member 1.

The electrostatic latent images formed on the surface of the electrophotographic photosensitive member 1 are then developed into toner images with the toner contained in the developer of the developing device 5.

Subsequently, the toner images on the surface of the electrophotographic photosensitive member 1 are transferred to a transfer medium P, such as a paper sheet, one after another from a transfer device 6, such as a transfer roller. The toner images on the surface of the electrophotographic photosensitive member 1 may be transferred once to an intermediate transfer medium and then to the transfer medium such as a paper sheet. The transfer medium P is fed to an abutting portion between the electrophotographic photosensitive member 1 and the transfer device 6 from a transfer medium feeder (not shown) in synchronization with the rotation of the electrophotographic photosensitive member 1.

The transfer medium P to which the toner images have been transferred is separated from the surface of the electrophotographic photosensitive member 1 and introduced into a fixing device 8, in which the toner images are fixed, thus being ejected as an image-formed article (printed material or copy).

The surface of the electrophotographic photosensitive member 1 after the toner images have been transferred is cleaned with a cleaning device 7, such as a cleaning blade, to remove therefrom the developer (toner) remaining after transfer. Subsequently, the electrophotographic photosensitive member 1 is subjected to pre-exposure (not shown) with a pre-exposure device (not shown) to remove static electricity before being reused to form images. If the charging device 3 is of contact charging type, such as a charging roller as shown in FIG. 1, however, pre-exposure is not necessarily required.

Some of the components of the electrophotographic apparatus including the electrophotographic photosensitive member 1, the charging device 3, the developing device 5, the transfer device 6, and the cleaning device 7 may be combined in a single container as an integrated process cartridge. The process cartridge may be removably mounted to an electrophotographic apparatus such as a copy machine or a laser beam printer. In the embodiment shown in FIG. 1, the electrophotographic photosensitive member 1, the charging device 3, the developing device 5, and the cleaning device 7 are integrated into a cartridge. The cartridge is guided by a guide 10 such as a rail of the electrophotographic apparatus body, thus being used as a removable process cartridge 9 in the electrophotographic apparatus.

EXAMPLES

The subject matter of the present disclosure will be further described in detail with reference to Examples and Comparative Examples. The subject matter is however not limited to the following Examples. In the following Examples, "part(s)" is on a mass basis unless otherwise specified.

Synthesis of Polyester Resins

Synthesis 1: Synthesis of Polyester Resin A

An acid halide solution was prepared by dissolving 42.2 g of a dicarboxylic acid halide in dichloromethane. The dicarboxylic acid halide is represented by the following formula:

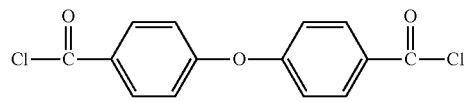 [SMILES: O=C(Cl)c1ccc(Oc2ccc(C(=O)Cl)cc2)cc1]

Also, a diol compound solution was prepared by dissolving 54.1 g of a diol in 10% aqueous solution of sodium hydroxide and stirring the solution in the presence of tributylbenzylammonium chloride added as a polymerization catalyst. The diol is represented by the following formula:

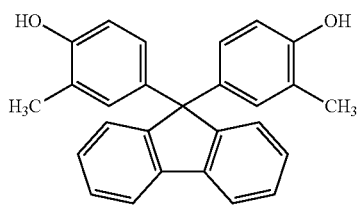

Then, the acid halide solution was added to the diol compound solution with stirring to start a polymerization. The polymerization was made at a reaction temperature kept at 25° C. or less for 3 hours with stirring. During the polymerization reaction, p-tert-butylphenol was added as a polymerization regulator. Then, acetic acid was added to terminate the polymerization reaction, and the reaction solution was repeatedly washed with water until the aqueous phase was turned neutral. After washing, the dichloromethane phase was dropped into methanol to precipitate the polymerization product. The polymerization product was vacuum-dried to yield 70.8 g of polyester resin A. The resulting polyester resin A had the structure represented by formula (I-1) and the structure represented by formula (II-A-1). The weight average molecular weight of polyester resin A was 120,000.

Synthesis Examples 2 to 25

Polyester resins B to U and CE-1 to CE-4 shown in Table 1 were synthesized in the same manner as in Synthesis Example 1.

TABLE 1

Synthesis of Polyester Resins

| Synthesis No. | Polyester resin | Structures of polyester resin (mole proportions) | | Mw |
|---|---|---|---|---|
| Synthesis 1 | A | I-1 | II-A-1 | 120000 |
| Synthesis 2 | B | I-1 | II-A-2 | 110000 |
| Synthesis 3 | C | I-1/I-2 (50/50) | II-A-1 | 110000 |
| Synthesis 4 | D | I-1/I-3 (70/30) | II-A-1 | 100000 |
| Synthesis 5 | E | I-1/I-4 (70/30) | II-A-1 | 90000 |

TABLE 1-continued

Synthesis of Polyester Resins

| Synthesis No. | Polyester resin | Structures of polyester resin (mole proportions) | | Mw |
|---|---|---|---|---|
| Synthesis 6 | F | I-1 | II-A-1/II-2-4 (30/70) | 120000 |
| Synthesis 7 | G | I-1 | II-A-1/II-2-16 (50/50) | 80000 |
| Synthesis 8 | H | I-1 | II-A-1/II-2-16 (80/20) | 11000 |
| Synthesis 9 | I | I-1 | II-A-1/II-2-15 (90/10) | 60000 |
| Synthesis 10 | J | I-1 | II-B-1 | 120000 |
| Synthesis 11 | K | I-1 | II-B-2 | 110000 |
| Synthesis 12 | L | I-1 | II-B-3 | 120000 |
| Synthesis 13 | M | I-1 | II-B-4 | 110000 |
| Synthesis 14 | N | I-1 | II-B-5 | 110000 |
| Synthesis 15 | O | I-1/I-2 (70/30) | II-B-1 | 100000 |
| Synthesis 16 | P | I-1/I-3 (50/50) | II-B-2 | 100000 |
| Synthesis 17 | Q | I-1 | II-B-1/II-2-4 (30/70) | 120000 |
| Synthesis 18 | R | I-1 | II-B-2/II-2-4 (50/50) | 100000 |
| Synthesis 20 | S | I-1 | II-B-1/II-2-8 (50/50) | 120000 |
| Synthesis 21 | T | I-1 | II-B-1/II-2-16 (50/50) | 90000 |
| Synthesis 22 | U | I-1 | II-B-1/II-2-16 (80/20) | 100000 |
| Synthesis 23 | CE-1 | I-1 | II-2-8 | 80000 |
| Synthesis 24 | CE-2 | I-1 | II-2-8/II-2-16 (50/50) | 90000 |
| Synthesis 25 | CE-3 | I-2/I-3 (50/50) | II-A-1 | 100000 |
| Synthesis 26 | CE-4 | I-2/I-3 (50/50) | II-B-1 | 100000 |

In Table 1, the weight average molecular weight of each resin is the polystyrene equivalent weight average molecular weight (Mw).

The proportion of each structure in the polyester resin can be determined by a conventional analytical method. The proportion of the polyester resin concerned to the total mass of the resins in the surface layer can also be determined by a conventional analytical method. An exemplary analytical method will be described below.

First, the surface layer of the electrophotographic photosensitive member is dissolved in a solvent. Subsequently, the constituents of the surface layer are separated and collected by a size exclusion chromatograph, a high-performance liquid chromatograph, or any other apparatus that can separate and collect the constituents. The polyester resin thus separated and collected was subjected to nuclear magnetic resonance analysis and mass spectroscopy for calculating the number of repetitions and the mole percentage of each structure.

Alternatively, the polyester resin may be hydrolyzed into a carboxylic acid portion and a bisphenol portion in the presence of an alkali or the like. The bisphenol portion thus obtained was subjected to nuclear magnetic resonance analysis and mass spectroscopy for calculating the number of repetitions and the mole percentage of the structure.

Preparation of Electrophotographic Photosensitive Members

Example 1

An aluminum cylinder of 24 mm in diameter and 257 mm in length was used as a support member (electrically conductive support member).

Then, a dispersion liquid was prepared from the following materials:
metal oxide particles: 214 parts of titanium oxide ($TiO_2$) particles coated with oxygen-deficient tin oxide ($SnO_2$);
binder: 132 parts of phenol resin (phenol resin monomer/ oligomer, product name: Plyophen J-325 produced by DIC, resin solids content: 60% by mass); and
solvent: 98 parts of 1-methoxy-2-propanol.

These materials were blended in a sand mill containing 450 parts of glass beads of 0.8 mm in diameter at a rotational speed of 2000 rpm for 4.5 hours with cooling water set to 18° C., thus yielding the dispersion liquid. Then, the glass beads were removed from the dispersion liquid through a mesh (openings: 150 μm).

Silicone resin particles (product name: Tospearl 120, manufactured by Momentive Performance Materials, average particle size: 2 μm) were added as a surface roughening agent to the dispersion liquid. The proportion of the silicone resin particles at this time was adjusted to 10% by mass relative to the total mass of the metal oxide particles and the binder in the dispersion liquid from which the glass beads had been removed. Also, a silicone oil (SH28PA produced by Dow Corning Toray) was added as a leveling agent to the dispersion liquid in a proportion of 0.01% by mass relative to the total mass of the metal oxide particles and the binder in the dispersion liquid, and the mixture was stirred to yield a coating liquid for forming an electroconductive layer.

This coating liquid was applied to the surface of the support member by dip coating. The resulting coating film was dried and cured by heating at 150° C. for 30 minutes. Thus, a 30 μm-thick electroconductive layer was formed.

Subsequently, 15 parts of N-methoxymethylated 6-nylon resin Tresin EF-30T (produced by Nagase Chemtex) and 5 parts of a copolymerized nylon resin Amilan CM8000 (produced by Toray) were dissolved in a mixed solvent of 220 parts of methanol and 110 parts of 1-butanol to yield a coating liquid for forming an undercoat layer.

This coating liquid was applied onto the surface of the electroconductive layer by dip coating. The resulting coating film was dried at 100° C. for 10 minutes to yield a 0.65 μm-thick undercoat layer.

Next, 2 parts of a polyvinyl butyral (product name: S-LEC BX-1, produced by Sekisui Chemical) was dissolved in 100 parts of cyclohexanone. To the resulting solution was added 4 parts of crystalline hydroxygallium phthalocyanine (charge generating material) whose CuKα X-ray diffraction spectrum has strong peaks at Bragg angle 2θ of 7.4°±0.2° and 28.1°±0.2°. These materials were blended at 23° C.±3° C. for 1 hour in a sand mill containing glass beads of 1 mm in diameter. After this blending, 100 parts of ethyl acetate was added to the mixture to yield a coating liquid for forming a charge generating layer. This coating liquid was applied onto the undercoat layer by dip coating. The resulting coating film was dried at 90° C. for 10 minutes to yield a 0.20 μm-thick charge generation layer.

Subsequently, 5 parts of the compound (charge transporting material) represented by formula (CTM-7) and 10 parts of polyester resin A synthesized in Synthesis 1 were dissolved in a mixed solvent of 33 parts of dimethoxymethane and 49 parts of cyclopentanone to yield a coating liquid for forming a charge transport layer.

The coating liquid for the charge transport layer was applied onto the surface of the charge generating layer by dip coating. The resulting coating film was dried at 130° C. for 30 minutes to yield a 23 μm-thick charge transport layer (surface layer).

Thus, an electrophotographic photosensitive member was prepared which includes the support member, the electroconductive layer, the undercoat layer, the charge generating layer, and the charge transport layer in this order.

The resulting electrophotographic photosensitive member was evaluated as described below.

OTHER EXAMPLES AND COMPARATIVE EXAMPLES

Electrophotographic photosensitive member samples were prepared in the same manner as in Example 1, except that the polyester resin and the charge transporting material were replaced as shown in Tables 2 to 4.
Evaluation
Charge Carrier Mobility Test Charge carrier mobility was measured with a voltage direct application type electrophotographic photosensitive member measuring apparatus using a curved NESA glass.

More specifically, the surface of the electrophotographic photosensitive member was brought into close contact with the NESA glass. Then, a voltage was applied to the NESA glass to charge the electrophotographic photosensitive member to a predetermined surface potential (Vd: −700 V). After the charging was kept for 0.5 second, the voltage applied to the NESA glass was turned off, and the electrophotographic photosensitive member was immediately subjected to exposure. The exposure dose was controlled so that the surface potential (V1) 0.1 second after exposure would be −500 V.

Figure 2:
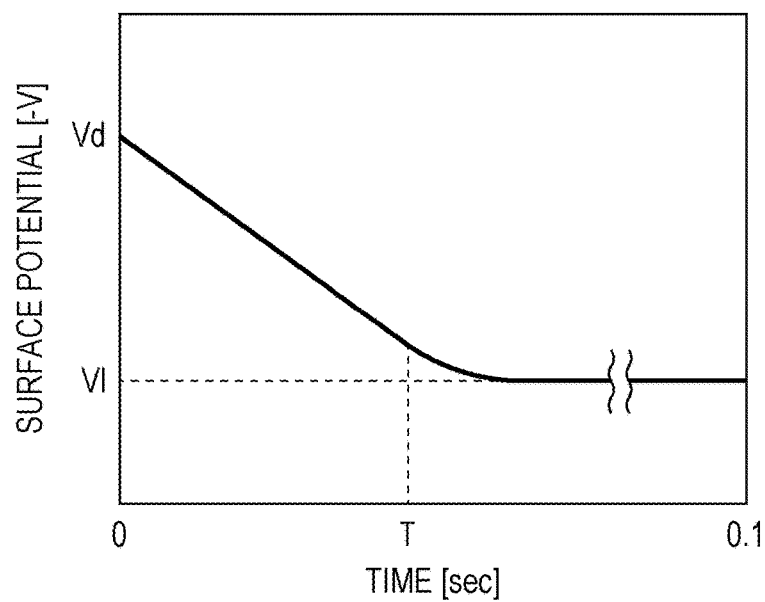
FIG. 2 is a plot of the changes in potential at the surface of an electrophotographic photosensitive member in a charge carrier mobility test.

FIG. 2 is a plot of changes in potential at the surface of an electrophotographic photosensitive member in this test. The period immediately after exposure during which the potential was changing linearly was calculated from the plot shown in FIG. 2 and was defined as charge transport time T. Using the charge transport time T, the thickness d of the charge transport layer, and the surface potential Vd set at the beginning of the measurement, charge carrier mobility μ (cm$^2$/Vs) was calculated from the equation $\mu=d^2/(Vd\cdot T)$. The results are shown in Table 2.
Durability Test For durability test, a test apparatus (for printing 33 sheets per minute) modified from a color laser printer Color LaseJet Enterprise M552 (manufactured by Hewlett-Packard) was used. Each sample was tested under the environment of 15° C. in temperature and 10% RH in humidity. After an image pattern was printed on 5,000 sheets of A4 plain paper in an intermittent mode in which printing was stopped every time one printed sheet was output, the decrease in thickness of the charge transport layer in the center of the surface of the electrophotographic photosensitive member from the initial thickness was measured. For this measurement, a thickness meter Fischer MMS with an eddy current probe EAW 3.3 manufactured by Fischer was used. For evaluation, the decrease in thickness of the charge transport layer obtained after 5,000-sheet image output was converted to the decrease for 1,000 sheets. The results are shown in Table 2.
Evaluation of Reducing Ghosting The laser printer was set so that the static elimination light did not light, and the electrophotographic photosensitive member was installed in the black process cartridge of the laser printer. This process cartridge was mounted to the station for the black process cartridge. In this state, images were output.

Each sample was tested under the environment of 23° C. in temperature and 50% RH in humidity. First, using A4 plain paper sheets, a full color pattern (character pattern having a print coverage of 1% for each color) was output on 5,000 sheets, and then, a sheet of a white solid pattern, five sheets of a ghosting examination pattern, a sheet of a black solid pattern, and five sheets of the ghosting examination pattern were consecutively output in this order.

Figure 3:
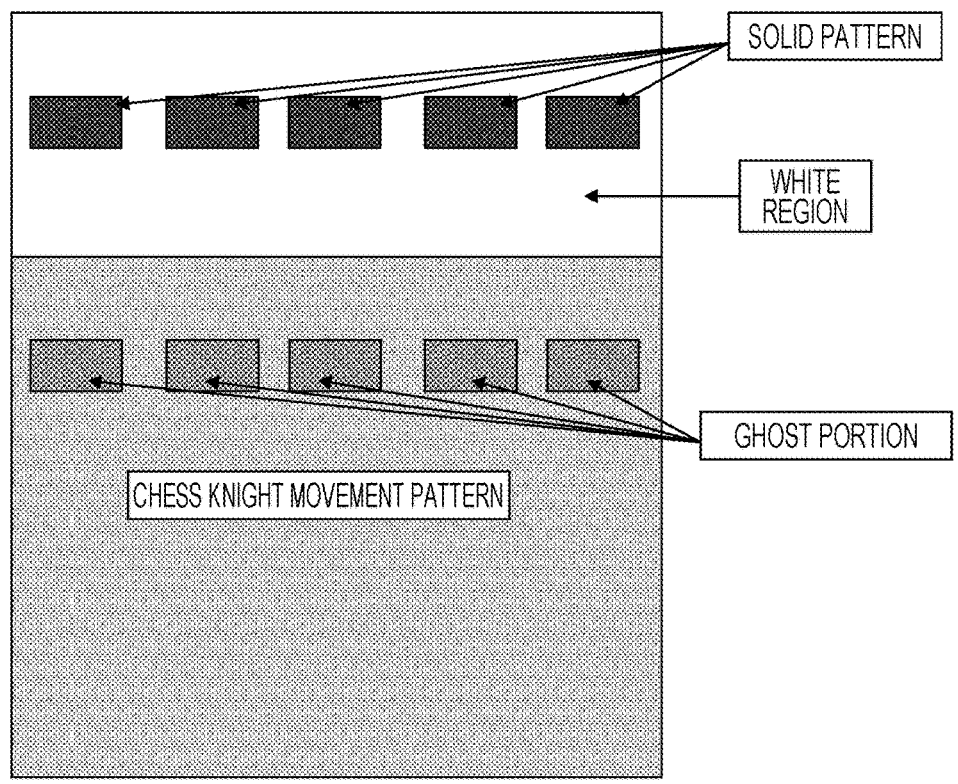
FIG. 3 is an illustrative representation of the patterns for a ghosting test.
Figure 4:
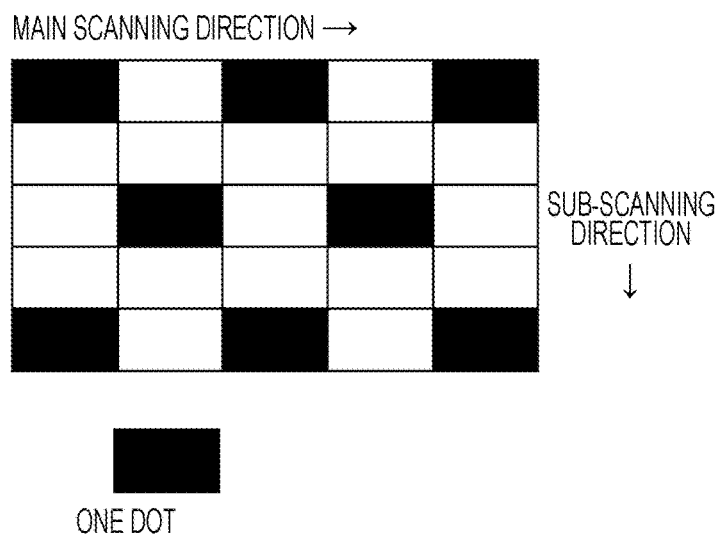
FIG. 4 is an illustrative representation of a halftone dot pattern like chess knight (Shogi keima) movement.

The ghosting examination pattern was formed as shown in FIG. 3 by printing "solid rectangles" in the white region at the head of the sheet and then printing a halftone dot pattern like chess knight (Shogi keima) movement as shown in FIG. 4. The "ghost" portions in FIG. 3 are each a portion in which the "solid rectangles" can cause ghosting.

For evaluation of ghosting, the difference in density between the halftone dot pattern like chess knight movement and the ghost portion was measured. More specifically, the density difference was measured at 10 points for each sheet of the ghosting examination pattern, using a spectroscopic densitometer X-Rite 504/508 (manufactured by X-Rite). This operation was performed on all the 10 sheets of the ghosting examination pattern, and the average of Macbeth density differences at 100 points in total was calculated for evaluation. The results are shown in Table 3.
Evaluation of Reducing Memory Effect of Light The developer in the black station of the laser printer modified for examination was replaced with a potential measurement device so as to measure the surface potential of the electrophotographic photosensitive member at the developing position. For measuring the surface potential of the electrophotographic photosensitive member, a potential probe MODEL 6000B-8 (manufactured by Trek Japan) was mounted in the potential measurement device, and the potential at the center in the generatrix direction of the electrophotographic photosensitive member was measured with a surface electrometer MODEL 344 (manufactured by Trek Japan). Each sample of the electrophotographic photosensitive member 1 was attached to a cartridge from which the cleaning blade was removed, and the cartridge was mounted to the black station of the test apparatus. The charging device and the image exposure device were set so that the potential of the electrophotographic photosensitive member could have a dark portion potential (Vd) of −500 V and a light portion potential (Vl) of −100 V under the conditions of 23° C. and 50% RH.

Samples for light memory effect test were prepared as below. First, a black light shield film that can cover the entirety of the electrophotographic photosensitive member was prepared, and a rectangular hole measuring 1.5 cm by 5 cm was formed in the center in the generatrix direction of the electrophotographic photosensitive member. This film was wound around each virgin sample of the electrophotographic photosensitive member to shield the entire sample except the hole. At this time, the position of the hole was adjusted so that the intersection of the diagonal lines of the hole lay at the center of the electrophotographic photosensitive member in the generatrix direction, and that the 1.5 cm side of the hole became parallel to the peripheral direction of the electrophotographic photosensitive member while the 5 cm side became parallel to the generatrix direction.

Subsequently, the position of the white light lamp (product name: Paralight FPL-27EX-N, manufactured by Hitachi was adjusted so that the surface of the electrophotographic photosensitive member could be exposed to light at 1500 lx. Then, the surface of the electrophotographic photosensitive member was irradiated with the white light emitted through the hole for 15 minutes. The amount of exposure was measured with a digital illuminance meter IM-3 (manufactured by Topcon).

Then, after the black film was removed, the light portion potentials of the shielded portion (VL1) and the unshielded portion (VL2) were measured 10 minutes after the termination of the irradiation with the white light, and the absolute value of the difference in light portion potential, ΔVL (ΔVL=|VL2−VL1|), was obtained as an indicator of the light memory effect. The results are shown in Table 4.

TABLE 2

Electrophotographic Photosensitive Member Production Conditions and Test Results

| | Production conditions | | | Test results | |
|---|---|---|---|---|---|
| Example | Charge transporting material* | Polyester resin | Charge transporting material/Polyester resin [parts/parts] | Charge carrier mobility [$cm^2/Vs(\times 10^{-6})$] | Durability: Decrease in thickness [μm] |
| Example 1 | (CTM-5) | A | 5/10 | 10.1 | 0.28 |
| Example 2 | (CTM-5) | B | 5/10 | 9.5 | 0.29 |
| Example 3 | (CTM-5) | C | 5/10 | 7.8 | 0.30 |
| Example 4 | (CTM-5) | D | 5/10 | 6.5 | 0.33 |
| Example 5 | (CTM-5) | E | 5/10 | 6.0 | 0.30 |
| Example 6 | (CTM-5) | F | 5/10 | 5.1 | 0.30 |
| Example 7 | (CTM-5) | G | 5/10 | 6.8 | 0.12 |
| Example 8 | (CTM-5) | H | 5/10 | 7.1 | 0.19 |
| Example 9 | (CTM-5) | I | 5/10 | 5.8 | 0.17 |
| Example 10 | (CTM-5) | J | 5/10 | 9.2 | 0.28 |
| Example 11 | (CTM-5) | K | 5/10 | 8.9 | 0.29 |
| Example 12 | (CTM-5) | L | 5/10 | 8.7 | 0.33 |
| Example 13 | (CTM-5) | M | 5/10 | 8.8 | 0.34 |
| Example 14 | (CTM-5) | N | 5/10 | 8.6 | 0.35 |
| Example 15 | (CTM-5) | O | 5/10 | 7.0 | 0.32 |
| Example 16 | (CTM-5) | P | 5/10 | 6.3 | 0.30 |
| Example 17 | (CTM-5) | Q | 5/10 | 5.1 | 0.32 |
| Example 18 | (CTM-5) | R | 5/10 | 7.8 | 0.24 |
| Example 19 | (CTM-5) | S | 5/10 | 7.2 | 0.25 |
| Example 20 | (CTM-5) | T | 5/10 | 5.8 | 0.13 |
| Example 21 | (CTM-5) | U | 5/10 | 5.7 | 0.19 |
| Example 22 | (CTM-1) | G | 10/10 | 6.5 | 0.19 |
| Example 23 | (CTM-1) | T | 10/10 | 6.3 | 0.19 |
| Example 24 | (CTM-3) | F | 8/10 | 6.1 | 0.29 |
| Example 25 | (CTM-4) | G | 5/10 | 6.0 | 0.14 |
| Example 26 | (CTM-7) | G | 7/10 | 6.8 | 0.15 |
| Example 27 | (CTM-6) | G | 7/10 | 8.8 | 0.17 |
| Example 28 | (CTM-8) | G | 6/10 | 6.8 | 0.15 |
| Example 29 | (CTM-9) | G | 4/10 | 5.7 | 0.12 |
| Example 30 | (CTM-4) | T | 5/10 | 5.9 | 0.14 |
| Example 31 | (CTM-7) | T | 7/10 | 5.8 | 0.16 |
| Example 32 | (CTM-6) | T | 7/10 | 5.4 | 0.17 |
| Example 33 | (CTM-8) | T | 6/10 | 5.5 | 0.15 |
| Example 34 | (CTM-9) | T | 4/10 | 6.5 | 0.12 |
| Example 35 | (CTM-1)/(CTM-2) (9/1) | A | 10/10 | 6.5 | 0.25 |
| Example 36 | (CTM-1)/(CTM-3) (8/2) | H | 10/10 | 6.4 | 0.18 |
| Example 37 | (CTM-1)/(CTM-2) (9/1) | J | 10/10 | 6.7 | 0.29 |
| Example 38 | (CTM-1)/(CTM-3) (8/2) | T | 10/10 | 6.4 | 0.19 |
| Comparative Example 1 | (CTM-5) | CE-1 | 5/10 | 3.2 | 0.45 |
| Comparative Example 2 | (CTM-5) | CE-2 | 5/10 | 0.8 | 0.40 |
| Comparative Example 3 | (CTM-5) | CE-3 | 5/10 | 4.5 | 0.59 |
| Comparative Example 4 | (CTM-5) | CE-4 | 5/10 | 4.3 | 0.58 |
| Comparative Example 5 | (CTM-3) | CE-1 | 8/10 | 2.8 | 0.52 |
| Comparative Example 6 | (CTM-4) | CE-1 | 5/10 | 2.6 | 0.48 |

TABLE 3

Electrophotographic Photosensitive Member Production Conditions and Test Results

| Example | Charge transporting material* | Polyester resin | Charge transporting material/Polyester resin [parts/parts] | Test results Macbeth density difference |
|---|---|---|---|---|
| Example 39 | (CTM-5) | A | 5/10 | 0.022 |
| Example 40 | (CTM-5) | F | 5/10 | 0.023 |
| Example 41 | (CTM-5) | G | 5/10 | 0.024 |
| Example 42 | (CTM-4) | G | 7/10 | 0.023 |
| Example 43 | (CTM-6) | G | 7/10 | 0.025 |
| Example 44 | (CTM-8) | G | 6/10 | 0.024 |
| Example 45 | (CTM-9) | G | 4/10 | 0.026 |
| Comparative Example 11 | (CTM-5) | CE-1 | 5/10 | 0.066 |
| Comparative Example 12 | (CTM-5) | CE-2 | 5/10 | 0.068 |
| Comparative Example 13 | (CTM-5) | CE-3 | 5/10 | 0.049 |
| Comparative Example 14 | (CTM-5) | CE-4 | 5/10 | 0.057 |

TABLE 2-continued

Electrophotographic Photosensitive Member Production Conditions and Test Results

| Example | Charge transporting material* | Polyester resin | Charge transporting material/Polyester resin [parts/parts] | Charge carrier mobility [cm$^2$/Vs(×10$^{-6}$)] | Durability: Decrease in thickness [μm] |
|---|---|---|---|---|---|
| Comparative Example 7 | (CTM-3) | CE-2 | 7/10 | 4.1 | 0.60 |
| Comparative Example 8 | (CTM-6) | CE-3 | 7/10 | 4.2 | 0.62 |

*For the case of using two materials in combination, their proportions are within parentheses. For example, "(CTM-1)/(CTM-2) (9/1)" represents (CTM-1):(CTM-2) = 9 pars:1 part.

TABLE 4

Electrophotographic Photosensitive Member Production Conditions and Test Results

| Example | Charge transporting material* | Polyester resin | Charge transporting material/Polyester resin [parts/parts] | Test results Light memory effect ΔVL (V) |
|---|---|---|---|---|
| Example 46 | (CTM-5) | J | 5/10 | 8 |
| Example 47 | (CTM-5) | S | 5/10 | 7 |
| Example 48 | (CTM-5) | T | 5/10 | 6 |
| Example 49 | (CTM-7) | S | 7/10 | 9 |
| Example 50 | (CTM-6) | S | 7/10 | 9 |
| Example 51 | (CTM-8) | S | 6/10 | 8 |
| Example 52 | (CTM-9) | S | 4/10 | 8 |
| Comparative Example 15 | (CTM-5) | CE-1 | 5/10 | 21 |
| Comparative Example 16 | (CTM-5) | CE-2 | 5/10 | 19 |
| Comparative Example 17 | (CTM-5) | CE-3 | 5/10 | 18 |
| Comparative Example 18 | (CTM-5) | CE-4 | 5/10 | 20 |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-247121 filed Dec. 20, 2016, which is hereby incorporated by reference herein in its entirety.

What is claimed is:

1. An electrophotographic photosensitive member comprising:
a surface layer containing a charge transporting material and a polyester resin, the polyester resin including a structure represented by general formula (I) and a structure represented by general formula (II):

wherein $X^1$ represents a divalent group; and

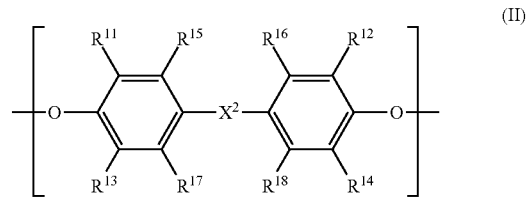

wherein $X^2$ represents a member selected from the group consisting of a single bond, an oxygen atom, divalent alkylene groups, and divalent cycloalkylidene groups, and $R^{11}$ to $R^{12}$ each represent a member selected from the group consisting of a hydrogen atom and alkyl groups,
wherein the structure represented by general formula (I) includes a structure represented by formula (I-1):

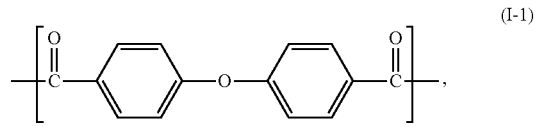

and the structure represented by general formula (II) includes at least one of a structure represented by general formula (II-A) and a structure represented by general formula (II-B):

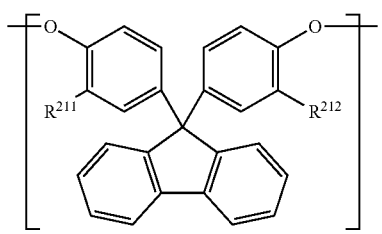
(II-A)

wherein $R^{211}$ and $R^{212}$ each represent a member selected from the group consisting of a hydrogen atom, a methyl group, and an ethyl group, and

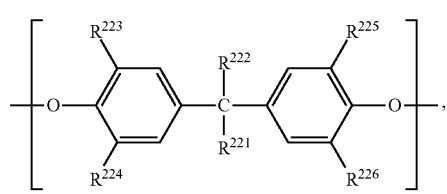
(II-B)

wherein $R^{221}$ and $R^{222}$ each represent a member selected from the group consisting of a hydrogen atom, a methyl group, an ethyl group, and a phenyl group, and $R^{223}$ to $R^{226}$ each represent a member selected from the group consisting of a hydrogen atom, alkyl group having a carbon number of 1 to 5, and a phenyl group, at least one of $R^{223}$ to $R^{226}$ being one of an alkyl group having a carbon number of 2 or more and a phenyl group.

2. The electrophotographic photosensitive member according to claim 1, wherein the proportion of the structure represented by formula (I-1) to all the structures represented by general formula (I) is 50% by mole or more in the polyester resin.

3. The electrophotographic photosensitive member according to claim 1, wherein the proportion of the structure represented by general formula (II-A) or the structure represented by general formula (II-B) to all the structures represented by general formula (II) is 30% by mole or more in the polyester resin.

4. The electrophotographic photosensitive member according to claim 1, wherein the structure represented by general formula (II) further includes a structure represented by general formula (II-2):

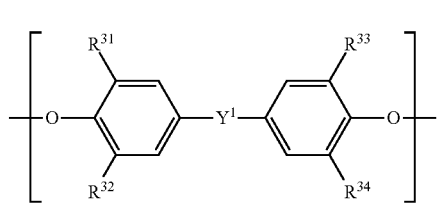
(II-2)

wherein $R^{31}$ to $R^{34}$ each represent a member selected from the group consisting of a hydrogen atom and alkyl groups, and $Y^1$ represents a member selected from the group consisting of a single bond, an oxygen atom, divalent alkylene groups, and divalent cycloalkylidene groups.

5. The electrophotographic photosensitive member according to claim 4 wherein $Y^1$ in general formula (II-2) represents a single bond.

6. A process cartridge capable of being removably attached to an electrophotographic apparatus, the process cartridge comprising:
an electrophotographic photosensitive member; and
at least one device selected from the group consisting of a charging device, a developing device, a transfer device, and a cleaning device, the at least one device being held together with the electrophotographic photosensitive member in one body,
wherein the electrophotographic photosensitive member includes a surface layer containing a charge transporting material and a polyester resin, the polyester resin including a structure represented by general formula (I) and a structure represented by general formula (II):

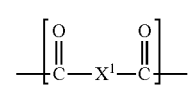
(I)

wherein $X^1$ represents a divalent group; and

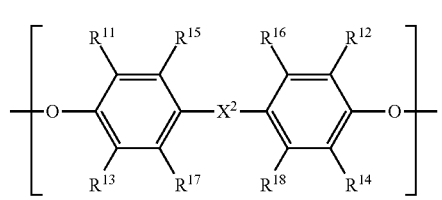
(II)

wherein $X^2$ represents a member selected from the group consisting of a single bond, an oxygen atom, divalent alkylene groups, and divalent cycloalkylidene groups, and $R^{11}$ to $R^{18}$ each represent a member selected from the group consisting of a hydrogen atom and alkyl groups, and wherein the structure represented by general formula (I) includes a structure represented by formula (I-1):

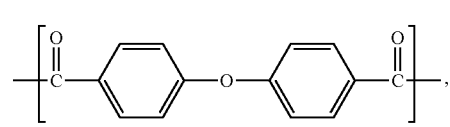
(I-1)

and the structure represented by general formula (II) includes at least one of a structure represented by general formula (II-A) and a structure represented by general formula (II-B):

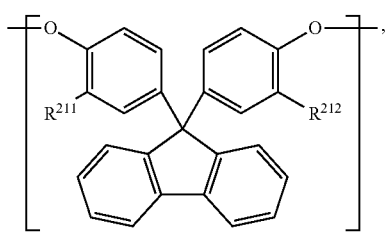

(II-A)

wherein $R^{211}$ and $R^{212}$ each represent a member selected from the group consisting of a hydrogen atom, a methyl group, and an ethyl group, and

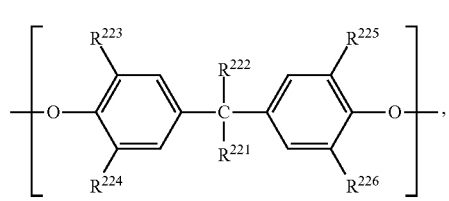

(II-B)

wherein $R^{221}$ and $R^{222}$ each represent a member selected from the group consisting of a hydrogen atom, a methyl group, an ethyl group, and a phenyl group, and $R^{223}$ to $R^{226}$ each represent a member selected from the group consisting of a hydrogen atom, alkyl group having a carbon number of 1 to 5, and a phenyl group, at least one of $R^{223}$ to $R^{226}$ being one of an alkyl group having a carbon number of 2 or more and a phenyl group.

7. An electrophotographic apparatus comprising:
an electrophotographic photosensitive member;
a charging device;
an exposure device;
a developing device; and
a transfer device,
wherein the electrophotographic photosensitive member includes a surface layer containing a charge transporting material and a polyester, the polyester resin including a structure represented by general formula (I) and a structure represented by general formula (II):

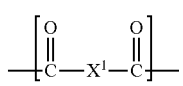

(I)

wherein $X^1$ represents a divalent group; and

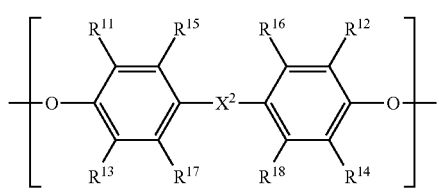

(II)

wherein $X^2$ represents a member selected from the group consisting of a single bond, an oxygen atom, divalent alkylene groups, and divalent cycloalkylidene groups, and $R^{11}$ to $R^{18}$ each represent a member selected from the group consisting of a hydrogen atom and alkyl groups, and wherein the structure represented by general formula (I) includes a structure represented by formula (I-1):

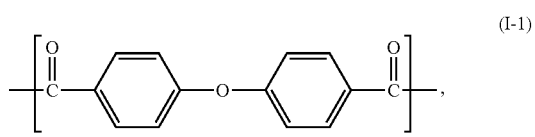

(I-1)

and the structure represented by general formula (II) includes at least one of a structure represented by general formula (II-A) and a structure represented by general formula (II-B):

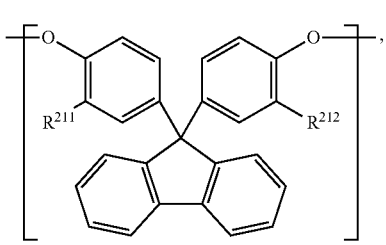

(II-A)

wherein $R^{211}$ and $R^{212}$ each represent a member selected from the group consisting of a hydrogen atom, a methyl group, and an ethyl group, and

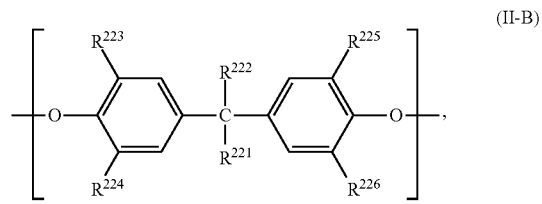

(II-B)

wherein $R^{221}$ and $R^{222}$ each represent a member selected from the group consisting of a hydrogen atom, a methyl group, an ethyl group, and a phenyl group, and $R^{223}$ to $R^{226}$ each represent a member selected from the group consisting of a hydrogen atom, alkyl group having a carbon number of 1 to 5, and a phenyl group, at least one of $R^{223}$ to $R^{226}$ being one of an alkyl group having a carbon number of 2 or more and a phenyl group.

\* \* \* \* \*